(12) United States Patent
Whatley et al.

(10) Patent No.: US 9,104,199 B2
(45) Date of Patent: Aug. 11, 2015

(54) ENGINE MONITORING

(75) Inventors: Paul D Whatley, Erlestoke (GB); James A Gopsill, Aylesbury (GB)

(73) Assignee: ROLLS-ROYCE PLC, London (GB)

( * ) Notice: Subject to any disclaimer, the term of this patent is extended or adjusted under 35 U.S.C. 154(b) by 279 days.

(21) Appl. No.: 13/010,151

(22) Filed: Jan. 20, 2011

(65) Prior Publication Data

US 2011/0191002 A1 Aug. 4, 2011

(30) Foreign Application Priority Data

Feb. 1, 2010 (GB) .................................. 1001513.9

(51) Int. Cl.
| | |
|---|---|
| *G06F 19/00* | (2011.01) |
| *G05B 23/02* | (2006.01) |
| *F02D 41/22* | (2006.01) |
| *F02D 41/24* | (2006.01) |
| *F02D 41/26* | (2006.01) |

(52) U.S. Cl.
CPC .............. *G05B 23/024* (2013.01); *F02D 41/22* (2013.01); *F02D 41/2496* (2013.01); *F02D 41/26* (2013.01)

(58) Field of Classification Search
USPC .................................... 701/99, 100, 101, 102
IPC ..................................................... G05B 23/024
See application file for complete search history.

(56) References Cited

U.S. PATENT DOCUMENTS

| | | | | |
|---|---|---|---|---|
| 3,731,070 | A * | 5/1973 | Urban ........................... | 701/100 |
| 3,937,934 | A * | 2/1976 | Pasemann ..................... | 700/290 |
| 4,215,412 | A * | 7/1980 | Bernier et al. ................ | 701/100 |
| 4,621,335 | A * | 11/1986 | Bluish et al. .................. | 340/945 |
| 4,992,946 | A * | 2/1991 | Butz et al. ..................... | 701/100 |
| 5,067,099 | A * | 11/1991 | McCown et al. ............. | 702/183 |
| 5,404,561 | A * | 4/1995 | Castelaz ........................ | 712/17 |
| 5,748,500 | A * | 5/1998 | Quentin et al. ............... | 702/182 |
| 5,991,684 | A * | 11/1999 | Fukuchi et al. ............... | 701/110 |
| 6,138,081 | A * | 10/2000 | Olejack et al. ................ | 702/104 |
| 6,157,310 | A * | 12/2000 | Milne et al. ................... | 340/679 |
| 6,262,550 | B1 * | 7/2001 | Kliman et al. ................ | 318/565 |
| 6,449,591 | B1 * | 9/2002 | Kondo et al. ................. | 704/222 |

(Continued)

FOREIGN PATENT DOCUMENTS

EP 0 393 541 A3 10/1990

OTHER PUBLICATIONS

British Search Report issued in British Application No. GB1001513.9 on Apr. 30, 2010.

*Primary Examiner* — Stefanos Karmis
*Assistant Examiner* — Michael E Butler
(74) *Attorney, Agent, or Firm* — Oliff PLC

(57) ABSTRACT

A method of monitoring a device, the method comprising: measuring one or more device operating parameters and a device performance parameter during one or more device operational periods; recording a plurality of data points, each data point comprising the device operating parameters and the associated device performance parameter; identifying one or more steady state regions in the device performance parameter and selecting a plurality of the data points from the one or more steady state regions in the device performance parameter; selecting one or more groups (40) of the steady state data points in the device operating parameter space by virtue of a predetermined density of the steady state data points in the device operating parameter space; and comparing the device performance parameter within the groups so as to identify a change in the performance of the device.

16 Claims, 9 Drawing Sheets

(56) References Cited

U.S. PATENT DOCUMENTS

| | | | |
|---|---|---|---|
| 6,556,956 B1* | 4/2003 | Hunt | 702/188 |
| 6,760,689 B2* | 7/2004 | Follin et al. | 702/188 |
| 6,838,933 B2* | 1/2005 | Goyette et al. | 330/51 |
| 7,149,632 B1* | 12/2006 | Gao et al. | 702/34 |
| 7,610,168 B2* | 10/2009 | Isumi et al. | 702/179 |
| 7,760,887 B2* | 7/2010 | Oxford | 381/66 |
| 2001/0023582 A1* | 9/2001 | Nagel | 60/204 |
| 2003/0105544 A1* | 6/2003 | Kauffman et al. | 700/109 |
| 2003/0163288 A1* | 8/2003 | Follin et al. | 702/188 |
| 2005/0049832 A1* | 3/2005 | Gorinevsky | 702/182 |
| 2005/0121005 A1* | 6/2005 | Edwards | 123/525 |
| 2005/0287386 A1* | 12/2005 | Sabol et al. | 428/543 |
| 2006/0047487 A1* | 3/2006 | Volponi et al. | 703/9 |
| 2006/0056959 A1* | 3/2006 | Sabol et al. | 415/118 |
| 2007/0006593 A1* | 1/2007 | Smith et al. | 60/772 |
| 2007/0124113 A1* | 5/2007 | Foslien et al. | 702/185 |
| 2008/0221835 A1* | 9/2008 | Volponi | 702/185 |
| 2009/0248179 A1* | 10/2009 | Kasai et al. | 700/78 |
| 2010/0121805 A1* | 5/2010 | Haynes et al. | 706/47 |
| 2011/0114615 A1* | 5/2011 | Daniel et al. | 219/137 R |

* cited by examiner

ENGINE MONITORING

This invention relates to a method of monitoring a device and particularly but not exclusively relates to monitoring an engine in order to identify a change in the performance of the engine.

BACKGROUND

The performance of a device, in particular an engine, may be monitored in order to detect a deterioration and/or predict a failure of the device. Such methods may be applied to engines, for example a gas turbine engine and in particular a jet engine, for which reliability is very important. In the case of a jet engine, there are presently two main methods for monitoring the performance of the engine.

The first of these monitoring methods comprises manually recording a steady-state snapshot during the take-off sequence of an aircraft. The pilot runs the engines up to their maximum and allows them to settle for a fixed period whereupon the values of the key engine parameters are noted and checked against datum values. If the values of the key engine parameters are within acceptable limits of the datum values the pilot will continue with the take-off run. The datum values comprises the parameters when the engine was initially installed or at a periodic engine check. Once the pilot has completed his flight he reports the values of the engine parameters and these are entered into a tool, which outputs a trend of the engine parameters and therefore engine performance from flight to flight. This tool is used to identify engines that have lost a certain amount of performance.

The second of these monitoring methods comprises a snapshot capturing system on board the aircraft. The system works during a flight and captures a snapshot based on a set of criteria, which the relevant parameters lie within. The system records a number of snapshots during a flight. The system rates the snapshots taken according to a desired set of operating parameters and the length of time the engine spends within a range of these parameters. Once the memory has been filled, if the next snapshot has a higher rating than the snapshots stored, then the system will remove the lowest rated snapshot and place the new snapshot within its memory.

There are however a number of problems with the above-described methods. In the first method, the snapshot system is susceptible to a human error with the pilot involved in noting down the values of the parameters. Also, the degree of accuracy at which the values can be taken from the dials is also limited. Furthermore, the snapshot system of the first method only looks at the performance of the engine at one flight condition. The accuracy of the trend produced by one point per flight is also limited and the validity of the trend relies on the accuracy at which the pilot can record the information during the take-off sequence.

In the case of the second method, having set criteria where the plane has to be operating for a snapshot to be taken prevents the engineer from understanding the performance of the engine across the whole flight profile.

The present invention therefore seeks to address these issues.

STATEMENTS OF INVENTION

According to a first aspect of the present invention there is provided a method of monitoring a device, the method comprising: measuring one or more device operating parameters and a device performance parameter during one or more device operational periods; recording a plurality of data points, each data point comprising the device operating parameters and the associated device performance parameter; identifying one or more steady state regions in the device performance parameter and selecting a plurality of the data points from the one or more steady state regions in the device performance parameter; selecting one or more groups of the steady state data points in the device operating parameter space by virtue of a predetermined density of the steady state data points in the device operating parameter space; and comparing the device performance parameter within the groups so as to identify a change in the performance of the device.

The method may further comprise one or more of: calculating differences between successive device performance parameter values; and identifying regions in which the absolute value of the differences may be below a threshold value in order to identify the one or more steady state regions in the device performance parameter.

The method may further comprise one or more of: calculating a first ratio of the change in the device performance parameter over a time period with respect to a datum steady state data point and a first successive device performance parameter; calculating a second ratio of the change in the device performance parameter to a time period with respect to the datum steady state data point and a second successive device performance parameter; calculating differences between the first and second ratios for a range of datum steady state data points; and identifying regions in which the absolute value of the differences may be below a threshold value in order to identify the one or more steady state regions in the device performance parameter.

The method may further comprise one or more of: calculating changes in the differences between first and second ratios for successive datum data points; and identifying regions in which the absolute value of the changes may be below a threshold value in order to identify the one or more steady state regions in the device performance parameter.

The method may further comprise one or more of: counting the number of steady state data points neighbouring a particular steady state data point within a predetermined domain about the particular steady state data point in the device operating parameter space; repeating for each steady state data point; and grouping steady state data points with a number of neighbouring steady state data points above a predetermined threshold into the one or more groups.

The predetermined domain about the particular steady state data point in the device operating parameter space may be determined by a predetermined range for each of the one or more operating parameters in the device operating parameter space. For example, the domain may be a rectangle in a 2D device operating parameter space (ie if there are two device operating parameters), or a cuboid in a 3D device operating parameter space (ie if there are three device operating parameters). There may be any number of device operating parameters and accordingly, the device operating parameter space may have any number of dimensions. The predetermined range may be the same for two or more of the operating parameters. For example, the domain may correspond to a square or a cuboid with two or more equal sides, eg a cube.

The predetermined range for a particular device operating parameter may vary according to the value of the device operating parameter. For example, in the case that the device is a jet engine and one of the device operating parameters is the altitude of the jet engine, differences in the altitude at low altitudes may affect the performance more than at higher altitudes and therefore the range may be smaller for low altitude values. By contrast, at higher altitudes the difference in attitudes may not be as significant and therefore the range may be larger than for low altitudes.

All points defining a boundary of the predetermined domain in the device operating parameter space may be equidistant from the particular steady state data point. For example, the domain may be a circle in a 2D device operating parameter space or a sphere in a 3D device operating parameter space. As previously stated, there may be any number of device operating parameters and accordingly, the device operating parameter space may have any number of dimensions and be of any shape.

The method may further comprise one or more of: calculating the distances between a steady state data point within the one or more groups and each of the remaining steady state data points within the one or more groups in the device operating parameter space; and identifying the steady state data points within a group by virtue of their proximity to one another so as to distinguish between the one or more groups.

The method may further comprise adjusting a device control parameter in response to the change in the performance of the device. The method may further comprise performing maintenance on the device in response to the change in the performance of the device.

The method may further comprise one or more of: monitoring a further device; and comparing the device performance parameter within the groups and between devices so as to identify a change in the performance of either device.

The device may comprise an engine, for example a gas turbine engine and in particular a jet engine. The device performance parameter may comprise one or more of a power output, a shaft speed, flow rates, fluid temperatures, fluid pressures, lubricant temperatures, lubricant pressures, device component temperatures, vibration levels, noise levels, strain levels and any other indicator of device performance. The method may be applied to a plurality of device performance parameters. The one or more device operating parameters may comprise one or more of ambient pressure, ambient temperature, ambient humidity, power input, power demand, bleed flow, spool speed, gas temperature or pressure ratio, fuel consumption rate, fuel calorific value, altitude, speed and any other indicator of device operating conditions.

According to a second aspect of the present invention there is provided a computer program, which when executed on a computer, causes it to carry out a method of monitoring a device, the method comprising: measuring one or more device operating parameters and a device performance parameter during one or more device operational periods; recording a plurality of data points, each data point comprising the device operating parameters and the associated device performance parameter; identifying one or more steady state regions in the device performance parameter and selecting a plurality of the data points from the one or more steady state regions in the device performance parameter; selecting one or more groups of the steady state data points in the device operating parameter space by virtue of a predetermined density of the steady state data points in the device operating parameter space; and comparing the device performance parameter within the groups so as to identify a change in the performance of the device. A computer storage medium may comprise the computer program.

According to a third aspect of the present invention there is provided apparatus for monitoring a device, the apparatus comprising a processor operable to: receive one or more device operating parameters and a device performance parameter during one or more device operational periods; record a plurality of data points, each data point comprising the device operating parameters and the associated device performance parameter; identify one or more steady state regions in the device performance parameter and select a plurality of the data points from the one or more steady state regions in the device performance parameter; select one or more groups of the steady state data points in the device operating parameter space by virtue of a predetermined density of the steady state data points in the device operating parameter space; and compare the device performance parameter within the groups so as to identify a change in the performance of the device.

In any of the above aspects, the various features may be implemented in hardware, middleware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

BRIEF DESCRIPTION OF THE DRAWINGS

For a better understanding of the present invention, and to show more clearly how it may be carried into effect, reference will now be made, by way of example, to the accompanying drawings, in which:—

DETAILED DESCRIPTION

The present invention relates to a method of monitoring a device, in particular an engine. The method comprises measuring one or more device operating parameters and a device performance parameter during one or more device operational periods. For example, in the case of the device being an aircraft engine, eg a jet engine, the device operating parameters may comprise air speed, altitude and power demand, and the device performance parameter may comprise one or more spool speeds. These may be measured over one or more flights of the aircraft. A plurality of data points comprising the device operating parameters and the associated device performance parameter are recorded and these may be stored on a computer storage medium.

With reference to FIGS. 1 to 4, having gathered the performance and operational data, the method subsequently comprises identifying one or more steady state regions in the device performance parameter. Accordingly, the initial part of the process focuses on the automation of taking steady-state snapshots from across the flight profile in the case of the device being an aircraft engine.

The process allows the data to dictate the location of a steady-state snapshot. In a first example, this may be achieved by calculating differences between successive device performance parameter values; and identifying regions in which the absolute value of the differences are below a threshold value in order to identify the one or more steady state regions in the device performance parameter. The first example may alternatively compare the changes between successive differences between successive device performance parameter values in order to additionally include regions in which the device performance parameter value may be steadily increasing or decreasing.

Figure 1:
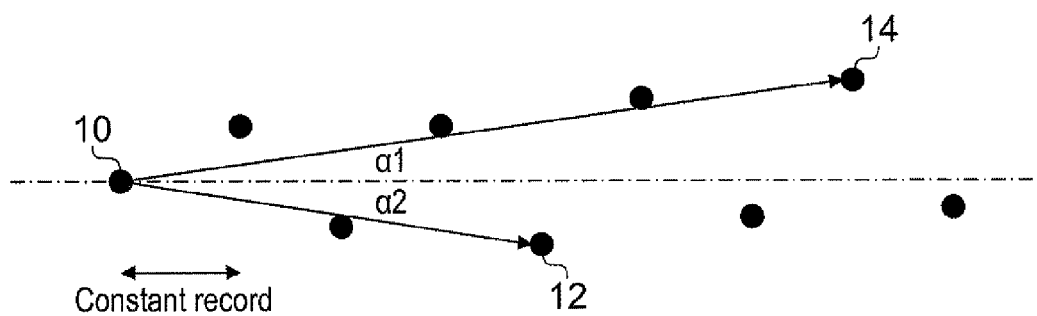
FIG. 1 shows how the angles are calculated by looking at two future points.

In a second example as shown in FIG. 1, the steady state regions may be identified by calculating a first ratio of the change in the device performance parameter over a time period with respect to a datum steady state data point 10 and a first successive device performance parameter 12; calculating a second ratio of the change in the device performance parameter over a time period with respect to the datum steady state data point 10 and a second successive device performance parameter 14; calculating differences between the first and second ratios for a range of datum steady state data points; and identifying regions in which the absolute value of the differences are below a threshold value in order to identify the one or more steady state regions in the device performance parameter. The first and second ratios may be converted into first and second angles, $\alpha_1$ and $\alpha_2$, as shown in FIG. 1. Furthermore, as also shown in FIG. 1, the first successive device performance parameter 12 need not be immediately successive of the datum data point 10. Similarly, the second successive device performance parameter 14 need not be immediately successive of the first successive device performance parameter 12. The process is repeated for each data point with each data point being a datum data point in turn, except for the last few data points for which there may be no successive data points. The difference between the first and second ratios is calculated for each data point.

The second example of identifying the steady state regions may be known as the gradient angle steady-state snapshot indicator algorithm. The algorithm works on a particular parameter that is recorded within the device operational period, eg the flight data. The algorithm initially performs a check for where the parameter has not changed greatly for a period of time and may use the first example of the steady state region identifier to perform this task. These areas may then be recorded as regions which the gradient angle indicator runs through. The gradient angle steady-state indicator algorithm runs through all the regions initially picked out from the flight profile and picks out the steadiest point from the region. The process will select snapshots from anywhere across the flight profile and has no limit on the number of snapshots that can be taken from a flight profile.

Figures 2A, 2B:
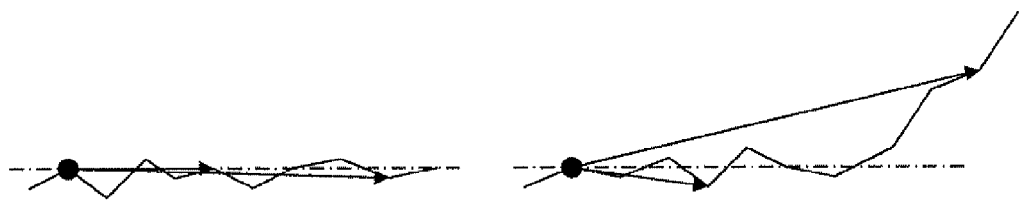
FIG. 2 shows how the comparison between the angles will change with FIG. 2a showing a steady state and FIG. 2b showing a behavioural change.

With reference to FIG. 2, the angle indicator runs through each point within a region and it looks at two future points along in the device performance parameter. Gradient angles are calculated between the initial point and the future points. These angles are then compared with one another. As shown in FIG. 2a, during a steady period within the data, the difference between the angles will be approximately zero. However, as shown in FIG. 2b, if there is a change in the parameters behaviour, the angle from the further most point will alter while the second future point will have an angle which remains approximately zero. Thus, when the angles are compared there would be a significant change in the comparison value and this is an indication of a behavioural change in the parameter.

The algorithms purpose is to indicate where the parameter has maintained a steady-state condition for a period of time and the position where the parameters behaviour changes and thus the optimum position for where a steady-state snapshot can be taken. The algorithm has the ability to be tailored to fit any type of parameter to look for changes in the behaviour of that particular parameter by the user selecting how far the future points have to be ahead of the point of interest. Also, by selecting the correct future points, noise within the data can be reduced and the underlying behavioural changes can be observed.

To further enhance the indication of a behavioural change within the parameters trace, an additional technique may be used which compares the comparison values of adjacent points. This reduces the number of points that indicate a behavioural change and leaves the key points where a behavioural change begins. For example, the method may further comprise: calculating changes in the differences between first and second ratios for successive datum data points; and identifying regions in which the absolute value of the changes are below a threshold value in order to identify the one or more steady state regions in the device performance parameter. In other words, the method may compare second order differences between the device performance parameter in order to filter out non-steady state regions.

Figure 3:
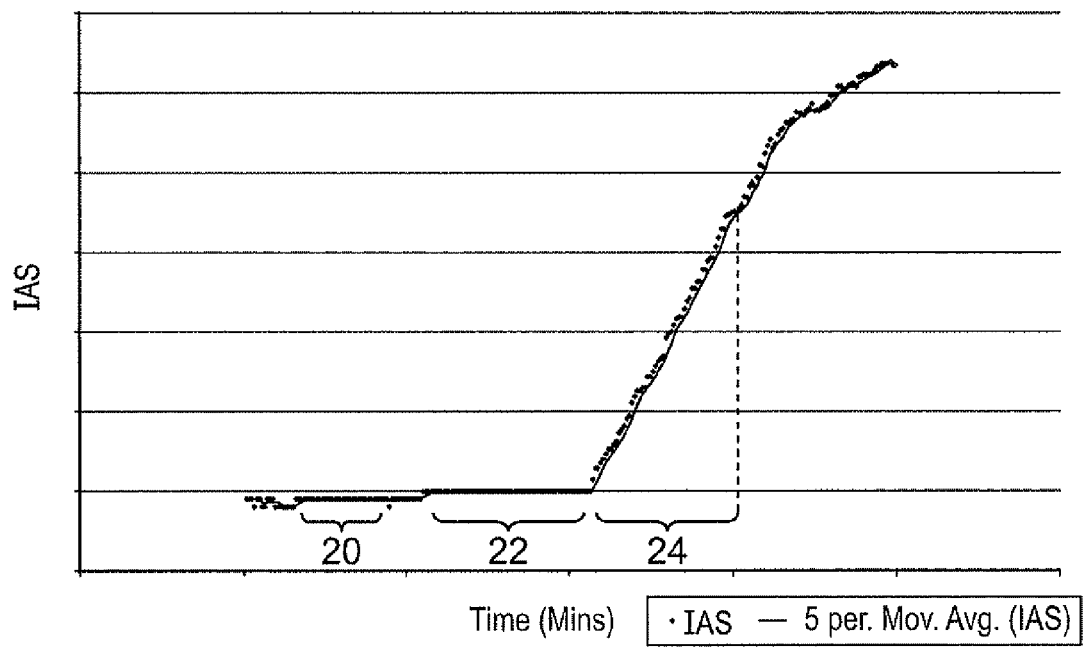
FIG. 3 shows a trace of a parameter exhibiting a behavioural change.
Figure 4:
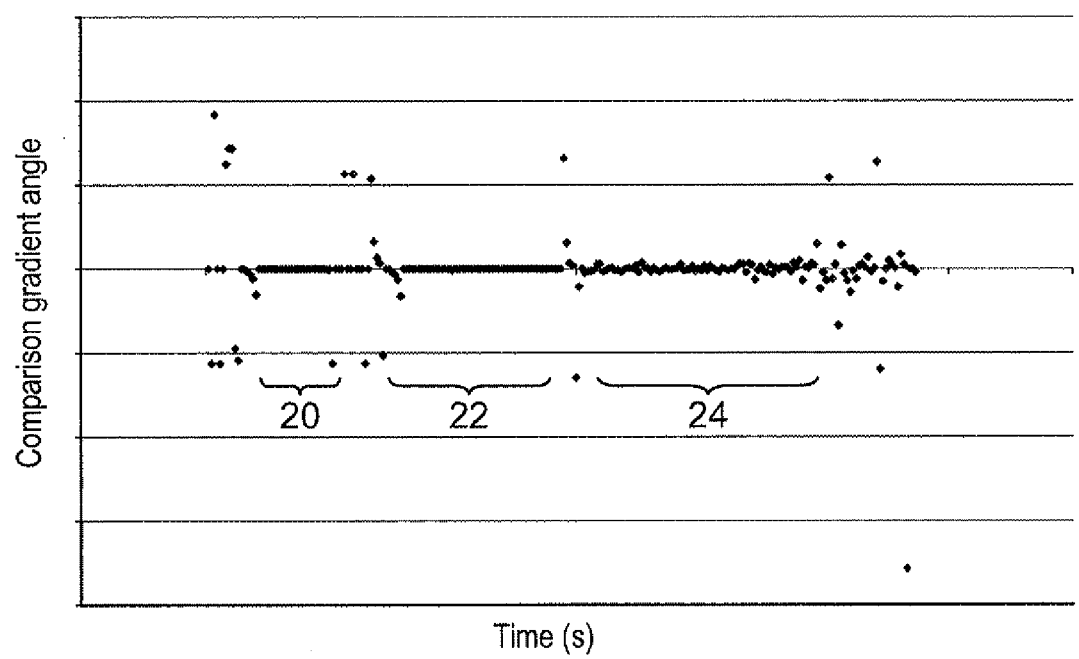
FIG. 4 shows the trace produced from the capturing technique indicating the locations of behavioural changes within the parameter trace.

By way of example, FIG. 3 shows a trace of a parameter, in this case Indicated Air Speed as a function of time. FIG. 4 shows the corresponding output from the algorithm indicating points of behavioural change within the trace. The selected steady state regions 20, 22, 24 are those for which the comparison between the gradient angles is below a predetermined threshold value.

With reference to FIGS. 5 to 9, having identified the steady state regions, the method subsequently comprises selecting a plurality of the data points from the one or more of the steady state regions in the device performance parameter. The snapshots taken from the gradient angle steady-state snapshot indicator algorithm, come from all areas of the device operational periods and to trend effectively, the points have to come from the same area. Rather than the engineers setting the criteria of where from the device operational periods the snapshots should be taken, the present invention allows the snapshot data to dictate where the best positions are within the device operational periods, for example where there is the highest concentrations of snapshot data. In other words, the method further comprises selecting one or more groups of the steady state data points in the device operating parameter space by virtue of a predetermined density of the steady state data points in the device operating parameter space; and comparing the device performance parameter within the groups so as to identify a change in the performance of the device.

Figure 6:
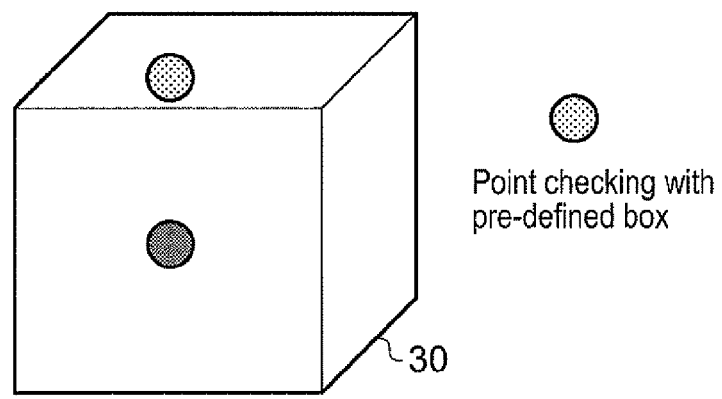
FIG. 6 shows a box surrounding a snapshot.

With reference to FIG. 6, the density of the steady state data points may be calculated by counting the number of steady state data points neighbouring a particular steady state data point within a predetermined domain 30 about the particular steady state data point in the device operating parameter space. This may be repeated for each steady state data point; and the steady state data points with a number of neighbouring steady state data points above a predetermined threshold may be grouped into the one or more groups.

The predetermined domain 30 about the particular steady state data point in the device operating parameter space may be determined by a predetermined range for each of the one or more operating parameters in the device operating parameter space. For example, the domain may be a rectangle in a 2D device operating parameter space (ie if there are two device operating parameters), or a cuboid in a 3D device operating parameter space (ie if there are three device operating parameters). There may be any number of device operating parameters and accordingly, the device operating parameter space may have any number of dimensions. The predetermined range may be the same for two or more of the operating parameters. For example, the domain may correspond to a square or a cuboid with two or more equal sides, eg a cube.

Figure 5:
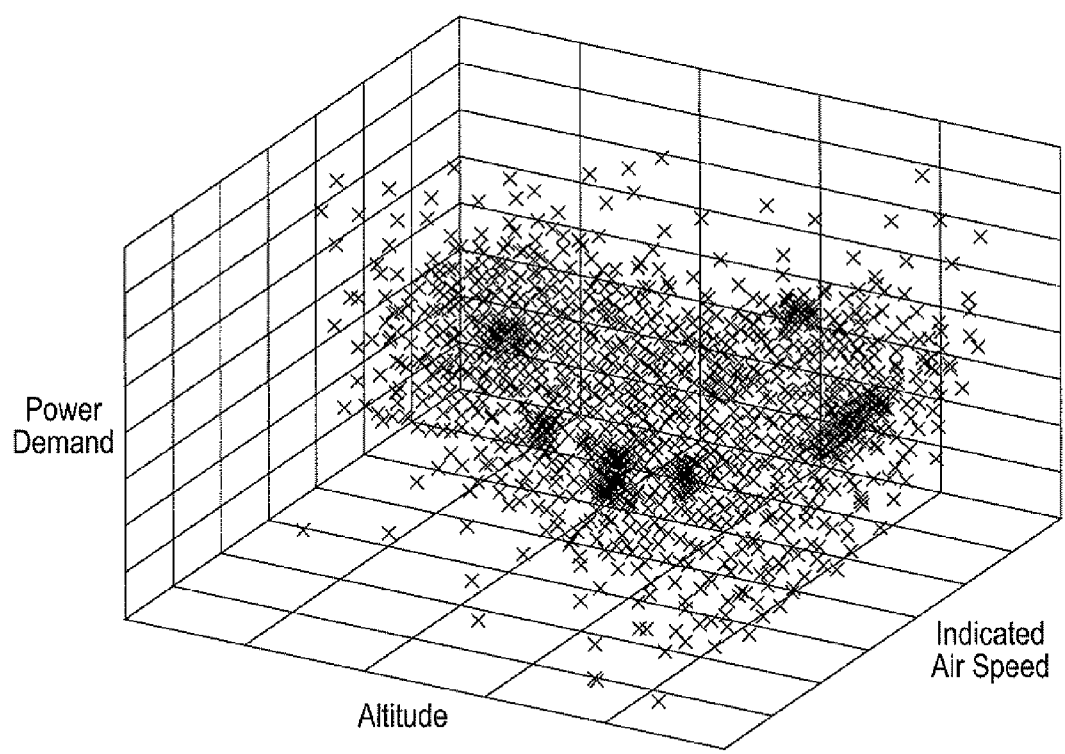
FIG. 5 shows the distribution snapshots across the flight profile with the areas of high density being coloured black.

As shown in FIG. 5, there may be three device operating parameters and, in the case of the device being a jet engine, these may comprise power demand, altitude and indicated air speed. The present invention runs through each snapshot within the dataset and, as shown in FIG. 6, creates an imaginary box around the point based on the three parameters with pre-determined limits. The remainder of the snapshots are compared to the imaginary box (or "boundary") to see whether they lie within the box and therefore could be associated as a near neighbour to the chosen point of interest. Once all the snapshots have been run through, an N value is attached to that particular snapshot which indicates how many neighbouring snapshots there are to the particular snapshot. This is repeated for every snapshot within the dataset.

Figure 7:
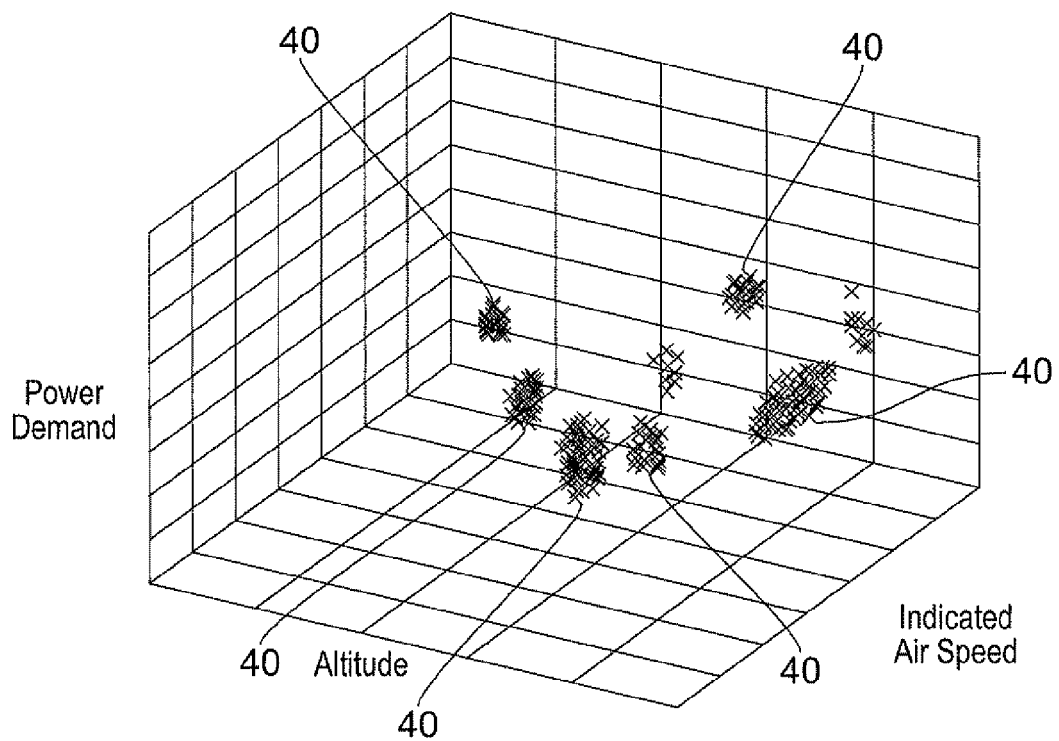
FIG. 7 shows the high density areas removed from the main dataset.
Figure 8:
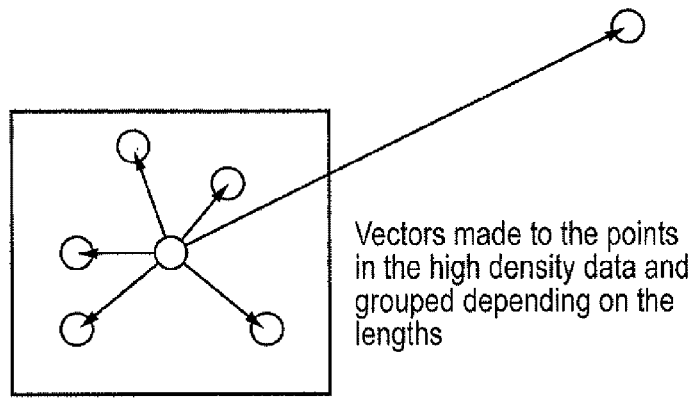
FIG. 8 shows a vector method for grouping points together.
Figure 9:
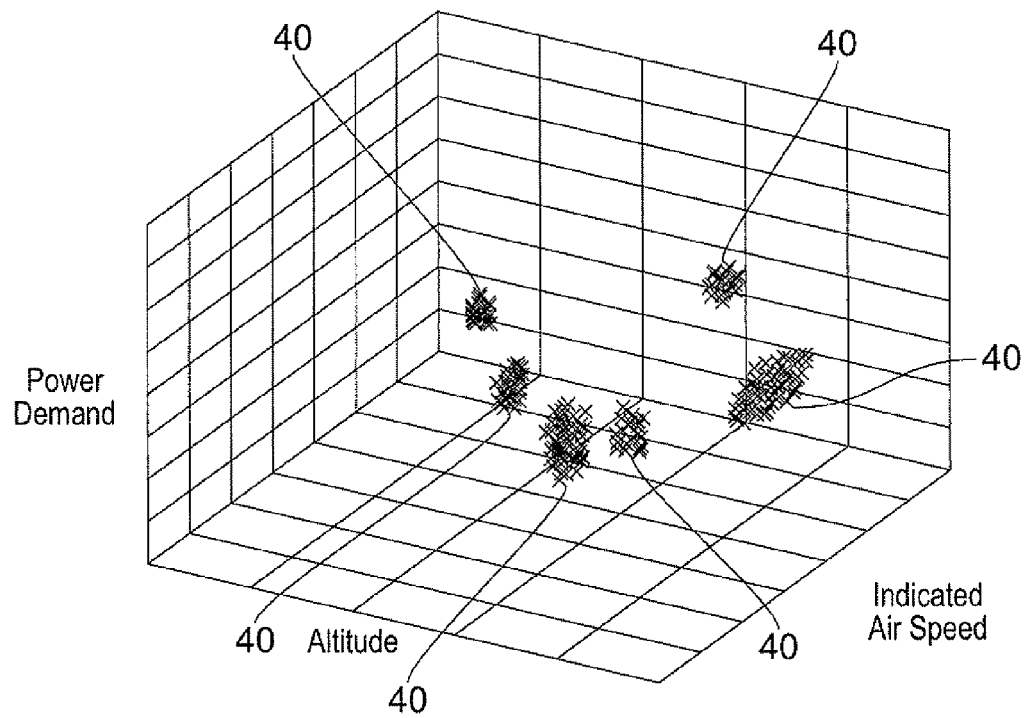
FIG. 9 shows the separate groups identified by the algorithm.

As shown in FIG. 7, the snapshots with the highest N values are then removed from the main dataset and these are used to class the areas where there is a region of high density 40 within the flight envelope. However, whilst the method has identified the areas of high density, they still remain as one dataset and therefore a further method may separate the data into individual groups. Accordingly, with reference to FIG. 8, the method may further comprise one or more of: calculating the distances between a steady state data point within the one or more groups and each of the remaining steady state data points within the one or more groups in the device operating parameter space; and identifying the steady state data points within a group by virtue of their proximity to one another so as to distinguish between the one or more groups. In other words, to separate the differing groups of high density data, the highest ranking N value is initially picked and vectors to each of the other snapshots within the high density group are made. If the magnitude of the vector is substantially different from the magnitude of the vectors to the other groups, then the other snapshot is deemed part of that particular group and these points are all removed and form a separate dataset. Statistical analysis of the vector magnitudes may be used to distinguish between the groups. This procedure is repeated with the remaining snapshots using the next highest N value remaining in the dataset until all the points have formed groups.

For the sake of computational efficiency or otherwise, the groups defined above may be used for subsequent operational periods without having to redefine the groups. Accordingly, the above-described groups may form the basis of one or more corresponding bins. Statistical analysis may be applied to each group in order to define a bin size and/or shape. For example, the mean, standard deviation, variance and/or range of the device operating parameter values may be calculated for each group, and from this information the definition for that particular bin can be derived. The bin may be any shape, for example rectangular or circular for a 2D device operating parameter space or cuboidal or spherical for a 3D device operating parameter space.

Having established the shape and/or size of each bin, the next procedure is to query all the snapshots from a particular device or from a range of devices, for example across a fleet of engines. In one example of the present invention, these may include non-steady state snapshots. Initially, all the snapshots are gathered and using the information such as the date of import, import number, duration of operation and the time at which the snapshot was taken, a cumulative time of the device operating hours is calculated with each snapshot having a calculated time of where it was taken along the device hour timeline. It is necessary for the snapshots to have an associated device hour time as the deterioration of the device's performance is often related to device hours. Once completed, the process will check each of the snapshots to the bin criteria defined and if the snapshot meets the criteria, it is then stored as part of that bin.

A computational and/or theoretical model may then be compared against the snapshot device performance data, which may comprise for example pressures, temperatures and spool speeds. The model is run at the same conditions that the engine was at, at the time of the snapshot. The values output from the model are used to compare against the values that were recorded within the snapshot. The model's error in solving for the varying flight conditions across the flight profile introduces noise within the data that can hide any trend the parameter may be exhibiting. The benefit of the present invention is that it reduces the noise introduced by the model, as the snapshots come from the same area of the flight profile.

Figure 10:
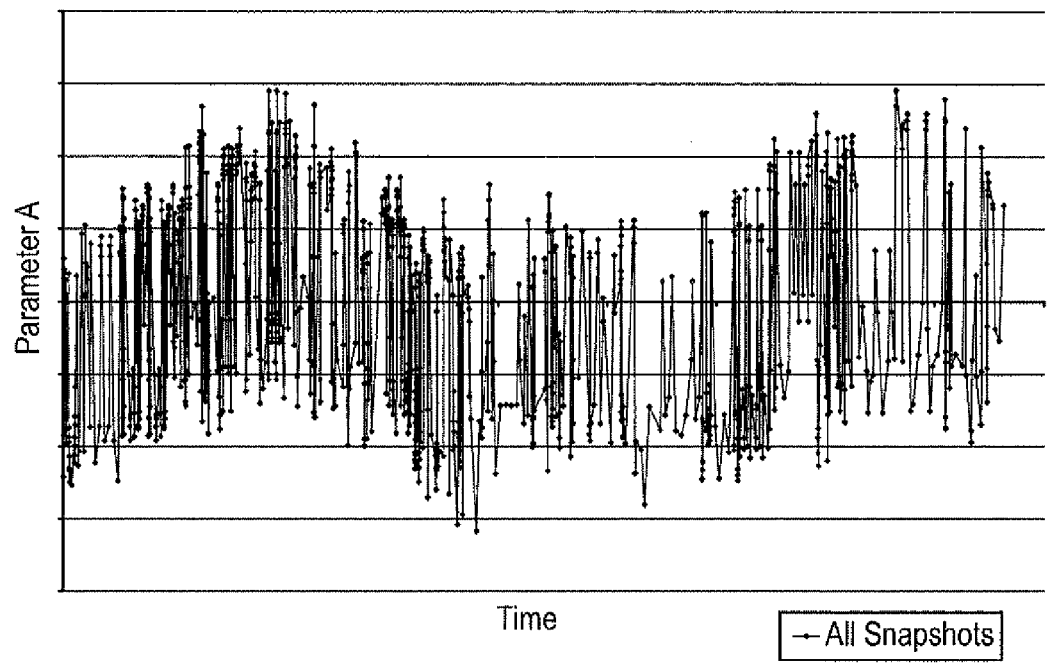
FIG. 10 shows the trend produced by taking all the snapshots from using the gradient angle steady-state indicator for a parameter A.
Figure 11:
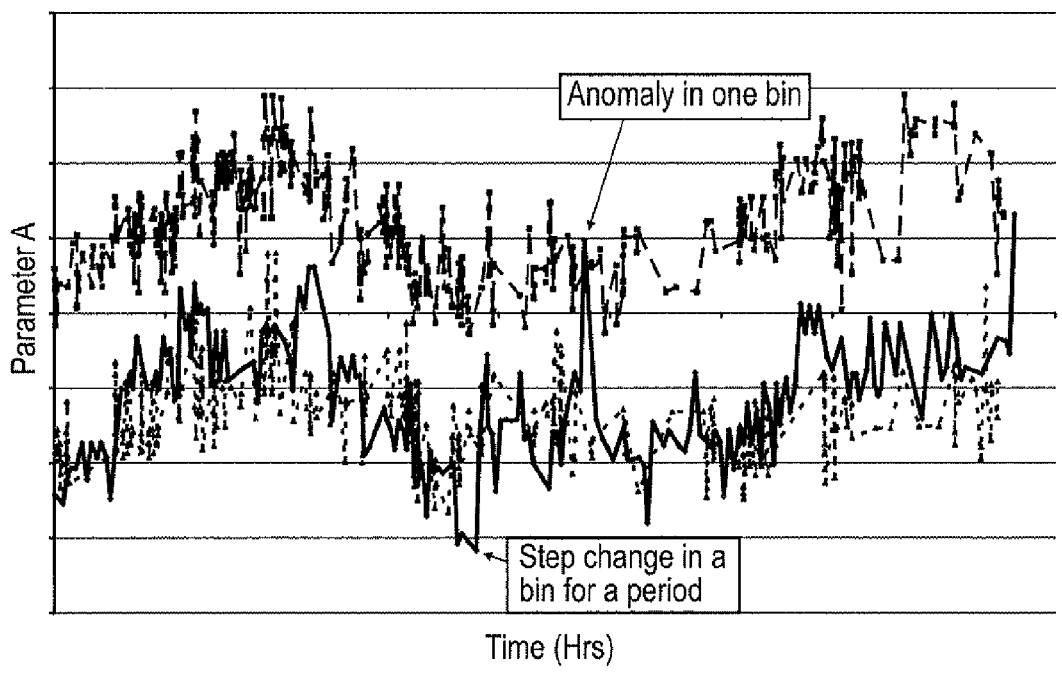
FIG. 11 shows the trend produced by the same snapshots for parameter A after they have been grouped and binned.
Figure 12:
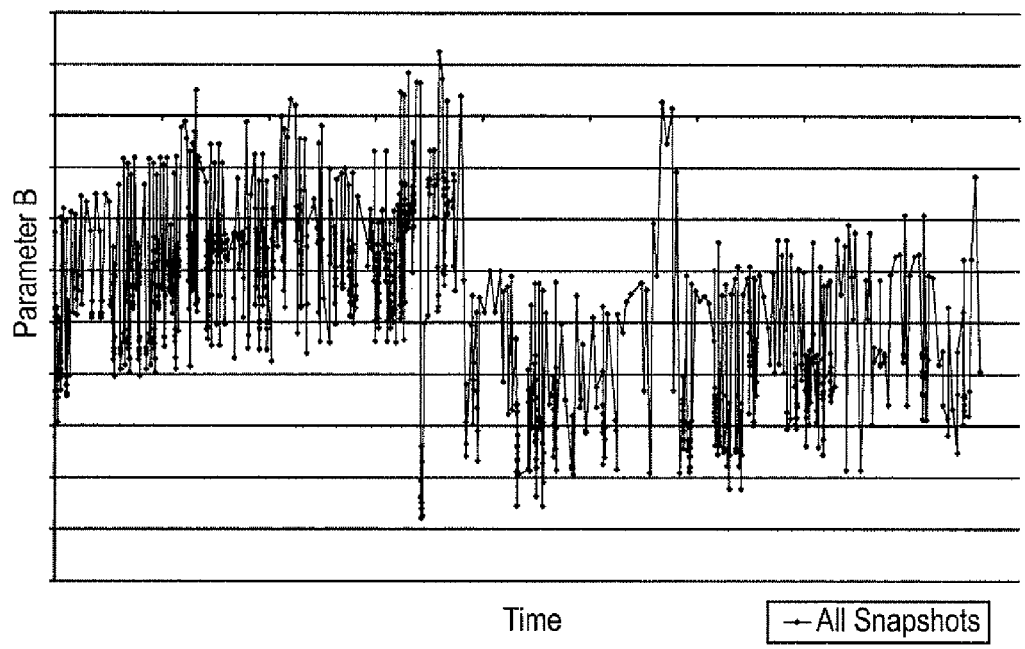
FIG. 12 shows the trend produced by taking all the snapshots from using the gradient angle steady-state indicator for a parameter B.
Figure 13:
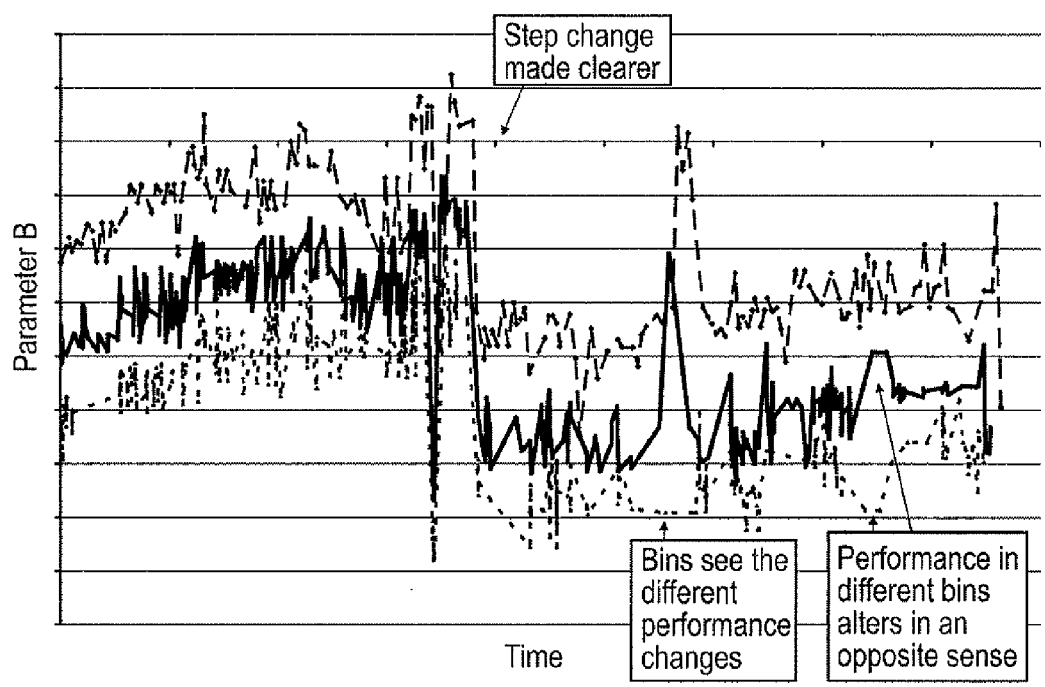
FIG. 13 shows the trend produced with aid of the grouping and binning technique for parameter B.

FIGS. 10 to 13 show how the grouping and binning methodology aids in producing a more accurate trend of the performance data. FIGS. 10 and 12 show the raw steady state data, whilst FIGS. 11 and 13 show the same data having been divided into three bins. Performance parameter A (FIGS. 10-11) and performance parameter B (FIG. 12-13) have been normalised with respect to the model estimates (ie they show the difference between the model and the snapshot values). Parameters A and B may be a pressure, speed or temperature or any other indicator of performance.

With reference to FIGS. 10 and 11, it can be seen that the noise within the trend has been reduced considerably. Also, step changes and anomalies are present in some of the bins, which can be associated with alterations in the engine. This will allow the issue to be understood more accurately and thus a more rapid maintenance response can occur. FIGS. 12 and 13 further demonstrate the present invention's ability to remove noise from the data and once again there are changes in the engine's behaviour in certain bins whilst not in the other bins. These changes can then be associated to engine behavioural events at particular operational parameters and thus appropriate planned action can be taken.

The trends produced are used to compare the parameter values to maximum limit values to ensure the performance has not decreased by a predetermined amount. If this occurs, a warning message is issued and appropriate diagnosis and maintenance is performed on the engine. The increase in accuracy from the trends produced will lead to a greater understanding of the performance of the engine at all positions within the flight envelope. This will reduce false rejections due to erroneous data and will provide a more accurate prediction of when the engine will pass the limit value, thereby enabling planned and organised maintenance.

Detection techniques may also use the trends to indicate whether there are anomalies and step changes within the trends. These anomalies and step changes can be associated with engine events that have occurred. Fault detection is therefore made possible and the increased accuracy of the trends will allow engineers to associate the anomalies with engine events with greater ease. Previously, these anomalies would not be noticed due to the noise within the trend. The association of the occurrences within the data and engine events will aid in diagnosing faults and thus reduce investigative time. Anomalies may be associated within events that occur further along in the engine's life and the onset of an engine event can be predicted.

The present invention is an automated solution to capturing and processing snapshots taken from across the operational period and allows more accurate trending of the device's performance with the additional benefit of knowing how the device is performing across the operational period. The present invention achieves this by allowing the data itself to decide where a snapshot should be taken and where in the operational period is the most appropriate area of interest, rather than an engineer deciding on the position of where snapshots and trending should occur. This provides the user with the optimum data for trending and therefore maximise the knowledge that can be gathered on the device's performance.

Furthermore, the present invention allows the trending of snapshots across a flight envelope of an aircraft, which is an improvement over the prior art where the snapshots taken were defined at certain points of the flight. Much more useful information is therefore available to the engineer. Having this availability of more snapshots will enable the trends to be of a higher fidelity and be less influenced by erroneous snapshots, which may indicate false performance issues.

The grouping and creation of bins allows an engineer to observe where the highest density regions of snapshots are across the flight profile, thereby providing an insight into the engine's performance within different areas of the flight profile. Different engine faults may alter the performance of the engine at different points in the flight profile. For example, a fault may allow rotation of a shaft to induce a resonance in the engine, which may only be apparent at a particular shaft speed and hence at a particular point in the flight profile. The present invention will permit an engineer to see such occurrences. The bins may be developed to be specific to an individual engine, thereby permitting the trending of performance to be tailored to each engine. Also, bins may be developed for a fleet and thus comparisons of performance can be made between engines across the fleet. The bins may be constantly updated as new data is added and may have the ability to adapt, always selecting the best position where trending can occur. The bins once defined may be fixed or allowed to change and this provides an engineer with the ability to look at the performance of the engine in different ways.

The present invention could be used to analyse any parameter that contains behavioural changes that an engineer would like to investigate. For example, rather than using a performance based parameter to spot steady-state snapshots of performance, a vibrational parameter could be used to capture steady-state vibrational signatures during a flight or operational period.

The use of a pre-defined box to calculate the N value for each snapshot could be altered to take into account the parameters used and thus the shape of the box that is used can be altered to reflect the parameters it is addressing. For instance, a spherical/rectangular shape may be more suitable to use to perform the near neighbour analysis. All points defining a boundary of the predetermined domain in the device operating parameter space may be equidistant from the particular steady state data point. For example, the domain may be a circle in a 2D device operating parameter space or a sphere in a 3D device operating parameter space. As previously stated, there may be any number of device operating parameters and accordingly, the device operating parameter space may have any number of dimensions.

Figure 14:
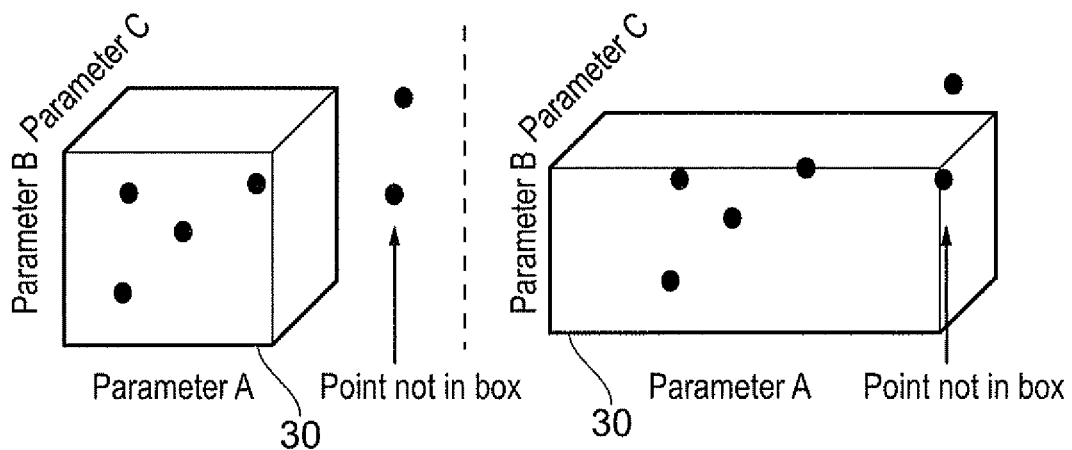
FIG. 14 shows the use of a different shape bin to indicate the nearest neighbours in a dataset.
Figure 15:
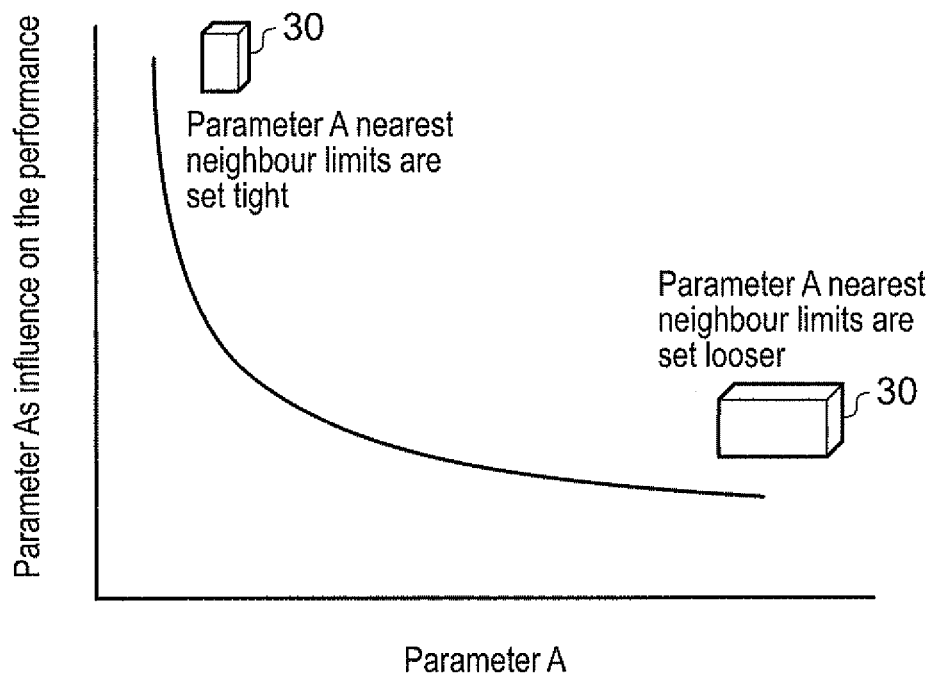
FIG. 15 shows a dynamic shape being used to indicate near neighbours within the dataset.

With reference to FIGS. 14 and 15, the predetermined range for a particular device operating parameter may vary according to the value of the device operating parameter. For example, in the case that the device is a jet engine and one of the device operating parameters (parameter A) is the altitude of the jet engine, differences in the altitude at low altitudes may affect the performance more than at higher altitudes and therefore the range may be smaller for low altitude values. By contrast, at higher altitudes the difference in attitudes may not be as significant and therefore the range may be larger than for low altitudes. In other words, the domain 30 may have a dynamically changing shape depending on the influence of the device operating parameters at a particular value. This will further ensure that snapshots that are close to each other with respect to a particular device operating parameter are grouped together where the variation of the particular device operating parameter has little effect on the device performance at that value. The present invention thus further ensures that the data decides the high-density locations within the dataset. This will further reduce the noise in the trend and ensure that any changes in the trends can be spotted thereby identifying a fault occurring within the engine.

The above described grouping and binning methods use three device operating parameters, ie 3 dimensions, to define the flight envelope. However, any number of device operating parameters may define the location of the snapshots with respect to the other snapshots. Having more than three device operating parameters may further enhance the method of grouping and creating bins and improve the trending accuracy.

Figure 16:
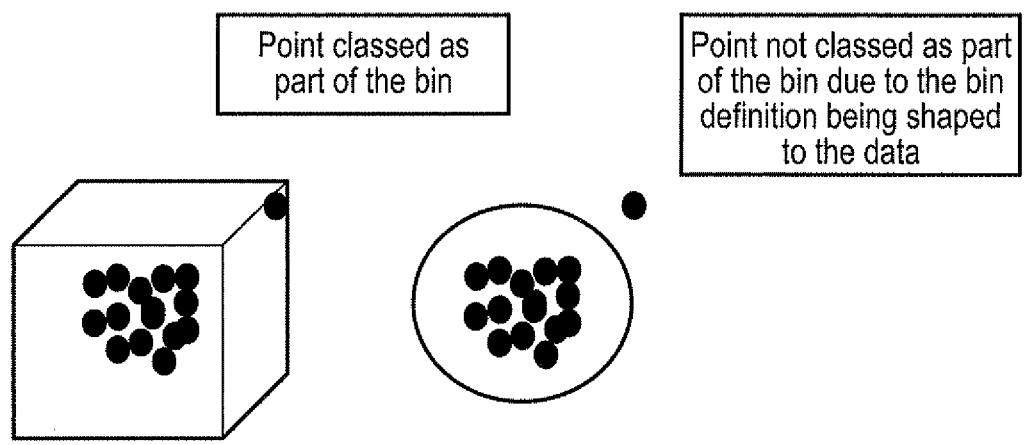
FIG. 16 shows how the bins may be shaped to suit the data.

With reference to FIG. 16, the above-described techniques used to create the definitions of the domains may be further enhanced by varying the shape of the domain, rather than defining a box around the data points. For example, the domain may be any shape, which encompasses only the closest data points. As shown in FIG. 16, the domain may be a shape with circular geometry in order to exclude data points which would have otherwise been included in a box-shaped domain. Tailoring the domain shape according to the data may further reduce the noise within the generated trends.

The present invention, as described above, gathers performance parameter snapshots and groups them with respect to their associated operating parameters. However, the methods are not necessarily limited to the analysis of performance parameters. The techniques may be adapted and/or configured to accept a variety of data with varying noise and data rates of record. Provided the data is influenced by a set of external parameter inputs, eg the device operational parameters, then the methods of the present invention may group the data and create domains based on these parameters, thereby ensuring that the external input is not having an effect on the noise within the data and that the trend produced may be more visible. One example may be to use the present invention to look at steady-state vibrations within the flight profile and depending on where the engine is running within the flight profile may affect the vibration signature produced. Furthermore, the flight envelope may not provide the device operational parameters and the methods of the present invention may accommodate different device operational parameters to define the location of the data.

The present invention provides an automated solution to capturing and processing snapshots taken from across the flight envelope of an aircraft and allows more accurate trending of the engine's performance with additional knowledge of how the engine is performing across the flight envelope. This is achieved by allowing the data to dictate where a snapshot should be taken and where in the flight envelope is the most appropriate area of interest, rather than the engineer deciding on the position of where snapshots and trending should occur.

Furthermore, the combination of techniques within the present invention will enable multiple trends from across the flight envelope to be analysed. The increased knowledge of the performance of the engine across the flight envelope will enable an engine operator to ensure that the engine is always performing as it should. The increase in accuracy will lead to fewer engines being falsely rejected on the basis of erroneous snapshot information. In addition, having trends from across the flight envelope will enable faults that have signatures within different areas of the flight envelope to be seen, which cannot be achieved with the prior art. This will lead to an improvement in maintenance planning for the engine.

By having an automated solution based upon the flight trace data, it removes the human error present in the current prior art manual process and gives a higher accuracy on the values recorded.

The invention claimed is:

1. A method comprising:
   monitoring, by a processor, a gas turbine engine across a flight envelope of an aircraft powered by the gas turbine engine, the monitoring comprising:
     measuring, by a processor, one or more operating parameters of the gas turbine engine and a performance parameter of the gas turbine engine during one or more operational periods of the gas turbine engine;
     recording, by a processor, a plurality of data points, each data point comprising the operating parameters and the associated performance parameter;
     identifying, by a processor, one or more steady state regions in the performance parameter and selecting a plurality of the data points from the one or more steady state regions in the performance parameter;
     selecting, by a processor, one or more groups of the steady state data points in the operating parameter space by virtue of a predetermined density of the steady state data points in the operating parameter space;
     comparing, by a processor, the performance parameter within the groups so as to identify a change in the performance of the gas turbine engine;
     counting, by a processor, the number of steady state data points neighbouring a particular steady state data point within a predetermined domain about the particular steady state data point in the operating parameter space;
     repeating, by a processor, for each steady state data point; and
     grouping, by a processor, steady state data points with a number of neighbouring steady state data points above a predetermined threshold into the one or chore groups, wherein all points defining a boundary of the predetermined domain in the operating parameter space are equidistant from the particular steady state data point.

2. A method as claimed in claim 1, wherein the method further comprises:
   calculating differences between successive performance parameter values; and
   identifying regions in which the absolute value of the differences are below a threshold value in order to identify the one or more steady state regions in the performance parameter.

3. A method as claimed in claim 1, wherein the method further comprises:
   calculating a first ratio of the change in the performance parameter over a time period with respect to a datum steady state data point and a first successive performance parameter;
   calculating a second ratio of the change in the performance parameter to a time period with respect to the datum steady state data point and a second successive performance parameter;
   calculating differences between the first and second ratios for a range of datum steady state data points; and
   identifying regions in which the absolute value of the differences are below a threshold value in order to identify the one or more steady state regions in the performance parameter.

4. A method as claimed in claim 3, wherein the method further comprises:
   calculating changes in the differences between first and second ratios for successive datum data points; and
   identifying regions in which the absolute value of the changes are below a threshold value in order to identify the one or more steady state regions in the performance parameter.

5. A method as claimed in claim 1, wherein the predetermined domain about the particular steady state data point in the operating parameter space is determined by a predetermined range for each of the one or more operating parameters in the operating parameter space.

6. A method as claimed in claim 5, wherein the predetermined range is the same for two or more of the operating parameters.

7. A method as claimed in claim 5, wherein the predetermined range for a particular operating parameter varies according to the value of the operating parameter.

8. A method as claimed in claim 1, wherein the method further comprises:
   adjusting a control parameter in response to the change in the performance of the gas turbine engine.

9. A method as claimed in claim 1, wherein the method further comprises:
   performing maintenance on the gas turbine engine in response to the change in the performance of the gas turbine engine.

10. A method as claimed in claim 1, wherein the method further comprises:
    monitoring a second gas turbine engine; and
    comparing the performance parameter within the groups and between the gas turbine engines so as to identify a change in the performance of either of the gas turbine engines.

11. A method as claimed in claim 1, wherein the performance parameter comprises one or more of a power output, a shaft speed, flow rates, fluid temperatures, fluid pressures, lubricant temperatures, lubricant pressures, component temperatures, vibration levels, noise levels, strain levels and any other indicator of gas turbine engine performance.

12. A method as claimed in claim 1, wherein the one or more operating parameters comprises one or more of ambient pressure, ambient temperature, ambient humidity, power input, power demand, fuel consumption rate, fuel calorific value, altitude, speed and any other indicator of operating conditions.

13. A method as claimed in claim 1, wherein the method is applied to a plurality of performance parameters.

14. A non-transitory computer-readable medium containing instructions, which when executed on a computer, carries out the following:
monitoring, by a processor, a gas turbine engine across a flight envelope of an aircraft powered by the gas turbine engine, the monitoring comprising:
measuring, by the processor, one or more operating parameters of the gas turbine engine and a performance parameter of the gas turbine engine during one or more operational periods of the gas turbine engine;
recording, by the processor, a plurality of data points, each data point comprising the operating parameters and the associated performance parameter;
identifying, by the processor, one or more steady state regions in the performance parameter and selecting a plurality of the data points from the one or more steady state regions in the performance parameter;
selecting, by the processor, one or more groups of the steady state data points in the operating parameter space by virtue of a predetermined density of the steady state data points in the operating parameter space;
comparing, by the processor, the performance parameter within the groups so as to identify a change in the performance of the gas turbine engine;
counting, by the processor, the number of steady state data points neighbouring a particular steady state data point within a predetermined domain about the particular steady state data point in the operating parameter space;
repeating, by the processor, for each steady stat data point; and
grouping, by the processor, steady state data points with a number of neighbouring steady state data points above a predetermined threshold into the one or more groups, wherein all points defining a boundary of the predetermined domain in the operating parameter space are equidistant from the particularly steady state data point.

15. An apparatus for monitoring a gas turbine engine, the apparatus comprising a computer storage medium configured to store a computer program and a processor configured to execute the program to:
monitor a gas turbine engine across a flight envelope of an aircraft powered by the gas turbine engine,
receive one or more operating parameters of the gas turbine engine and a performance parameter of the gas turbine engine during one or more operational periods of the gas turbine engine;
record a plurality of data points, each data point comprising the operating parameters and the associated performance parameter;
identify one or more steady state regions in the performance parameter and select a plurality of the data points from the one or more steady state regions in the performance parameter;
select one or more groups of the steady state data points in the operating parameter space by virtue of a predetermined density of the steady state data points in the operating parameter space;
compare the performance parameter within the groups so as to identify a change in the performance of the gas turbine engine;
count the number of steady state data points neighbouring a particular steady state data point within a predetermined domain about the particular steady state data point in the operating parameter space;
repeat for each steady state data point; and
group steady state data points with a number of neighbouring steady state data points above a predetermined threshold into the one or more groups, wherein all points defining a boundary of the predetermined domain in the operating parameter space are equidistant from the particular steady state data point.

16. A method comprising:
monitoring, by a processor, a gas turbine engine across a flight envelope of an aircraft powered by the gas turbine engine, the monitoring comprising:
measuring, by a processor, one or more operating parameters of the gas turbine engine and a performance parameter of the gas turbine engine during one or more operational periods of the gas turbine engine;
recording, by a processor, a plurality of data points, each data point comprising the operating parameters and the associated performance parameter;
identifying, by a processor, one or more steady state regions in the performance parameter and selecting a plurality of the data points from the one or more steady state regions in the performance parameter;
selecting, by a processor, one or more groups of the steady state data points in the operating parameter space by virtue of a predetermined density of the steady state data points in the operating parameter space;
comparing, by a processor, the performance parameter within the groups so as to identify a change in the performance of the gas turbine engine;
counting, by a processor, the number of steady state data points neighboring a particular steady state data point within a predetermined domain about the particular steady state data point in the operating parameter space;
repeating, by a processor, for each steady state data point;
grouping, by a processor, steady state data points with a number of neighboring steady state data points above a predetermined threshold into the one or more groups;
calculating the distances between a steady state data point within the one or more groups and each of the remaining steady state data points within the one or more groups in the operating parameter space; and
identifying the steady state data points within a group by virtue of their proximity to one another so as to distinguish between the one or more groups.

* * * * *